United States Patent [19]

Smilanich et al.

[11] Patent Number: 4,965,507
[45] Date of Patent: Oct. 23, 1990

[54] BATTERY CHARGER FOR DETECTING THE CURRENT RATE OF CHARGE FOR RECHARGEABLE BATTERIES

[75] Inventors: Nicholas J. Smilanich, Rocky River; Robert A. Sphar, Olmsted Falls, both of Ohio

[73] Assignee: Eveready Battery Company, Inc., St. Louis, Mo.

[21] Appl. No.: 377,370

[22] Filed: Jul. 7, 1989

[51] Int. Cl.⁵ ............................................. H02J 7/04
[52] U.S. Cl. .......................................... 320/48; 320/22
[58] Field of Search ................... 320/2, 21, 22, 23, 24, 320/48; 429/99, 159, 179

[56] References Cited

U.S. PATENT DOCUMENTS

| | | | |
|---|---|---|---|
| 3,506,902 | 7/1967 | Sullivan | 320/2 |
| 3,911,350 | 10/1975 | Swope | 320/22 |
| 4,006,396 | 2/1977 | Bogut | 320/22 X |
| 4,489,268 | 12/1984 | Beachy | 320/2 |
| 4,577,145 | 3/1986 | Mullersman | 320/2 |
| 4,628,243 | 12/1986 | Hodgman et al. | 320/2 |

FOREIGN PATENT DOCUMENTS

| | | | |
|---|---|---|---|
| 0263168 | 12/1988 | Fed. Rep. of Germany | 320/22 |
| 2085244 | 4/1982 | United Kingdom | 320/2 |
| 2115242 | 9/1983 | United Kingdom | 320/22 |

Primary Examiner—Steven L. Stephan
Assistant Examiner—Kristine Peckman
Attorney, Agent, or Firm—Robert W. Welsh

[57] ABSTRACT

The invention relates to a rechargeable battery for use in a charger device capable of delivering at least two different rates of charge current, said battery having a positive terminal and a spaced-apart negative terminal for delivering external power and receiving charging power, an indicator band disposed between the positive and negative terminals the location of which is indicative of the rate of charge that the battery can safely accommodate other than the rate of charge it could accept in the absence of the indicator band.

16 Claims, 1 Drawing Sheet

BATTERY CHARGER FOR DETECTING THE CURRENT RATE OF CHARGE FOR RECHARGEABLE BATTERIES

FIELD OF THE INVENTION

The invention relates to a charger for detecting rechargeable batteries and then providing a specific rate of charge current depending on the location of an indicator band on the battery.

BACKGROUND OF THE INVENTION

Many household appliances and light industry apparatus utilize cordless power supplies such as batteries. In recent years the rechargeable or secondary battery has emerged as a prime power supply for such devices and with the increase of battery operated toys, power tools and the like, new demands have been made not only for rechargeable batteries, but also for charging units. The basic requirement for a battery charging unit is a source of direct current having a voltage higher than that of a fully charged battery. Many techniques for charging secondary batteries are known, and the circuit components employed in such techniques are usually determined by the amount of control desired over the charging current and/or voltage. For different type secondary batteries, the charging current and voltage requirements are different. Secondary batteries are usually specified with a specific charge rate in terms related to the ampere-hour capacity. The charge rate in amperes is determined by dividing the battery capacity in ampere hours by the desired time of charging in hours; for example, 10 hours, but charging for a somewhat longer time or higher current is usually employed to insure full capacity discharge from the battery. Charge rates in commercial use today range from about a one hour rate to about a 30-hour rate.

Most of today's secondary battery units a "self-discharge" characteristic; and consequently, when a battery is left on a shelf for a long period of time, it will gradually lose charge or capacity. To maintain a battery in a peak charge condition, it may be advisable to charge the battery on a very low charge rate referred to as a trickle charge. Of course, the trickle rate may vary with different battery units but generally the trickle rate would be about a 20 hour rate.

Recent nickel-cadmium cells and batteries have been developed that can take a fast charge at a one-hour rate or less. Thus with the use of fast charge cells, shorter recharging times can be used. Various proposals made for charging secondary nickel-cadmium cells and batteries at high rates require some sort of fail safe means for terminating the high rate charge. If overcharge is continued at too high a rate of charge current, the oxygen gas, which normally reacts or combines with the active cadmium metal on the surface of the negative electrodes, known as the "oxygen recombination" principle, may not fully recombine and consequently result in an excessive internal gas pressure build up. This could not only damage the cell but could cause the cell under certain conditions to disassemble. One proposal for minimizing overcharge is to incorporate a pressure operated switch in the cell which would automatically cut off the charging current when the internal gas pressure reaches a predetermined level. Another proposal entails the incorporation of an oxygen-consuming auxiliary electrode in the cell to consume the oxygen gas as it evolves thereby preventing the build up of excessive internal gas pressure.

Thus it is necessary to insure that a fast charge at a high rate of current is not employed to charge batteries that should be charged at lower current rates. Fast charge rate batteries may employ temperature sensing means to detect the temperature rise of the battery, or use external voltage sensing means to detect the voltage of the battery during charging, both means of which are indicative of the charge condition of the battery. These means can be used to terminate a charging operation to prevent overcharge of the battery.

U.S. Pat. No. 4,628,243 discloses a battery charging system provided with means for detecting special indicia on the battery so that only batteries with this special indicia can be charged by the system. Thus only cells with the special indicia can be charged using this battery charging system.

U.S. Pat. No. 3,506,902 discloses the use of a separate, circumferential charging terminal positioned on a rechargeable battery so that a charger will only charge a rechargeable battery that is designed with this separate circumferential charging terminal. The separate terminal may be formed by cutting away a portion of the cell's insulation wrapper to expose an area of its conductive casing which can be used as the separate charging terminal.

U.S. Pat. No. 4,489,268 discloses a battery that employs a separate charging terminal contact that is spaced apart from the external power terminals so that such charging terminal contact can engage a corresponding charging contact positioned in a battery charger.

It is an object of the present invention to provide a rechargeable battery with an indicator band that can be sensed by a charging device so that a specific preferred charge rate can be applied to the rechargeable battery depending on the location of the indicator band on the battery.

Another object of the present invention is to provide a charging device that senses the presence of an indicator band on a rechargeable battery and then provides a specific preferable charge rate to the rechargeable battery depending on the location of the indicator band.

Another object of the present invention is to provide a battery charger for use with a rechargeable battery that is designed with an indicator band, the location of which determines the preferred rate of current that should be used to charge the rechargeable battery.

Another object of the present invention is to provide a rechargeable battery for use in a battery charger device designed to provide at least two different rates of charging current, said rechargeable battery having a positive terminal and a spaced-apart negative terminal for delivering power to an external device and also having an indicator band on the battery, the location of which is indicative of the specific rate of charge the battery can safely accept.

Further objects and advantages of the invention, as well as modifications obvious to those skilled in the art, will become apparent from the following description taken in conjunction with the accompanying drawings.

SUMMARY OF THE INVENTION

The invention relates to a battery charger system adapted to provide at least two different rates of charging current to rechargeable batteries and adapted to distinguish which rechargeable battery of similar size batteries should get which rate of charging current; said battery charger system comprising a rechargeable battery having a positive terminal spaced apart from a negative terminal for delivering power and having an indicator band disposed between said positive terminal and said negative terminal to indicate which rate of charging current it can accommodate; a charging device comprising current means for delivering at least two different rates of charging current; and detection means for sensing the presence and location of the indicator band on the rechargeable battery and for directing the circuit means to provide a specific rate of charging current to the rechargeable battery depending on the location of the indicator band on the rechargeable battery. The rechargeable battery of this invention is for use in a charging device capable of delivering at least two different rates of charging current, said rechargeable battery having a positive terminal and a spaced-apart negative terminal for delivering power to external devices and for receiving a charging current, and having an indicator band disposed between said positive terminal and said negative terminal in which the location of said indicator band is indicative of the rate of charging current the rechargeable battery can safely accommodate other than a different rate of charging current it could also accommodate if it did not have an indicator band.

As used herein a battery shall mean one or more cells. As also used herein an indicator band could mean a conductive or non-conductive strip located on the rechargeable battery if the battery was encased in an insulative or conductive outer jacket or label, respectively; a magnetic or non-magnetic strip if the outer wall of the battery is non magnetic or magnetic, respectively; a reflective or non reflective strip if the outer wall of the battery is non reflective or reflective, respectively; or an indicating means having characteristics different from the outer wall of the battery so that the presence of such characteristics can be detected as being different than the characteristics of the other portion of the outer wall of the battery. In rechargeable batteries housed in conductive containers and wrapped in insulating label materials, the label could be separated at a suitable location exposing an area of the conductive container and the exposed conductive area could be used as the indicator band of this invention. In another embodiment, a separate conductive band could be disposed about the outer wall of the battery and used as the indicator band. A requirement of the indicator band is that it provide a distinct indicator means that can be detected by the charging system so that the charging system can deliver a preferred rate of charging current to the battery. For example, the battery could be made to accept both a trickle charge and a fast charge. The preferred rate of charge would be the fast charge for most situations so that the indicator band would be provided on the rechargeable battery as a means which can be detected by the charging system to deliver a fast charge. Without the indicator band, the rechargeable battery could be given a trickle charge. Thus the indicator band could be used to indicate the preferred rate of charging current that the battery would safely accommodate.

As used herein, the indicator band could comprise one or more distinct strips positioned at a desired location on the battery to indicate the optimum and safe rate of current that the battery could accept. When using more than one strip, the charging system would be designed to detect the presence of the multi-strip indicator on the battery before charging the battery with a rate of current corresponding to the rate of current indicative of the multi-strip indicator. Preferably the indicator band would be positioned off center between the positive and negative terminals so that the preferred rate of current (usually a higher rate of current) would be given only when the battery was properly positioned in the charging device. If for some reason the battery was forced into the charging device in the reverse position, then only the current (usually trickle charge) that would be applied if the indicator band was not present would be applied.

The charger for use in the subject invention has to be capable of delivering at least two different rates of charging current and be provided with means for detecting the presence of the indicator band on the rechargeable battery. U.S. patent application Ser. No. 248,962 filed on Sept. 26, 1988 discloses an electronic battery charger device that can deliver at least two different rates of charge current and can be used with the rechargeable cells of this invention. The disclosure of this invention is incorporated herein as if it were presented in its entirety. This charger device includes means capable of individually evaluating a plurality of batteries of the same or of different kinds and with the same or different existing charge levels to be charged to determine which can be fast charged and which can not and proceeding to charge them accordingly. U.S. Pat. No. 3,911,350 discloses a dual battery charging rate device which can deliver two different rates of charging current for a rechargeable cell. The charger device for use in this invention has to have means for detecting the indicator band on the rechargeable battery so that once the indicator band is detected, the device will deliver a preferred rate of charging current to the rechargeable battery. If the battery does not have an indicator band, then a different rate of charging current can be applied to the terminals of the battery. As stated above, the battery is charged through its normal battery terminals while the indicator band is provided as a means for informing the charger device that it can safely accept a rate of charging current (usually fast charge) that could be too high for other types of batteries. Destruction of the indicator band on the battery will still permit the battery to be charged; however, the charge would be at a different rate of charging current.

The preferred rechargeable battery for use in this invention would be a conventional type cylindrical battery having an insulating label disposed about the wall of the battery and wherein the label would be split or cut so as to expose an annular area of the conductive container of the battery. The location of the annular area of the exposed container should be off-center to insure that the preferred rate of charge would be applied only if the battery is inserted in the proper manner into the charger device.

The understanding of the invention can be facilitated by reference to the drawings in which.

Figure 1:
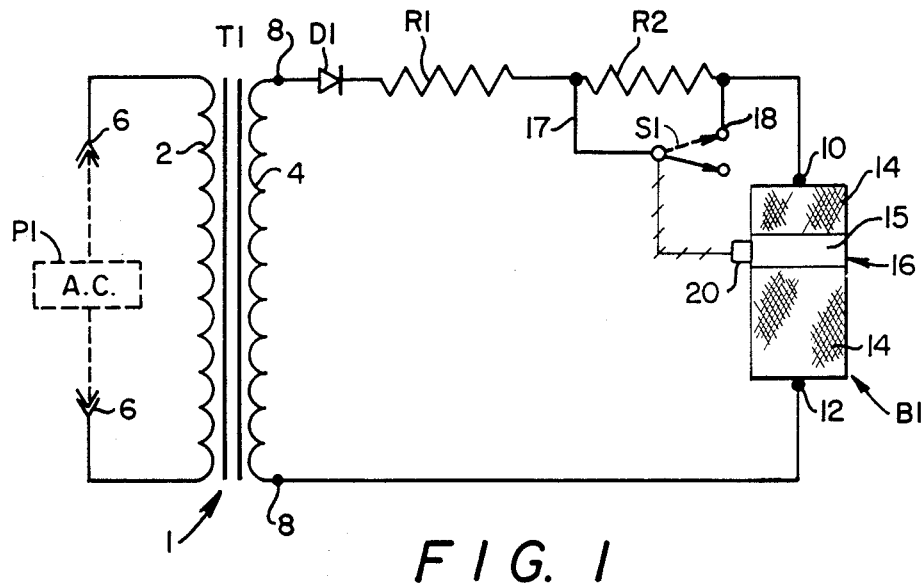
FIG. 1 is a circuit diagram showing a rechargeable battery of this invention being charged.

Referring to FIG. 1, the charger device 1 is provided with a transformer T1 having a primary winding 2 and secondary winding 4. The primary terminals 6—6 are adapted to connect to an alternating power supply P1. One secondary terminal 8 is connected to a diode D1 which is connected in series to resistor R1 which in turn is connected in series to resistor R2. The terminal from resistor R2 forms a first output terminal 10 while the second output terminal 12 is connected to the other end of secondary terminal 8 of transformer T1. With a battery B1 inserted in output terminal 10–12 of the charger device 1 and with an alternate current supply P1 connected to the primary terminals 6—6, a charging current flows into the battery B1. The diode D1 insures that the current only flows in one direction while the resistors R1 and R2 determine the amount of current fed into the battery B1. As shown in FIG. 1, the insulating jacket 14 on the battery B1 is separated to provide an annular exposed area 15 of the conductive container 16 of the battery B1. One electrical contact 17 is connected to one side of resistor R2 with its opposite end connected to one side of switch S1. A second electrical contact 18 is connected to the other side of resistor R2 with its opposite end connected to the other side of switch S1. In the normal operating position, switch S1 would be opened so that resistor R2 would be connected in the circuit. In the closed position (shown by broken lines), switch S1 would short resistor R2 and remove it from the circuit. The value of resistor R1 and resistor R2 is selected to provide a current that could be in the range of a trickle charge, while R1 is selected so that if it were used alone the current charge would be in the range of a fast charge. A detector means 20, such as a mechanical or electrical device, activates switch S1 when it detects the annular exposed area 15 of the conductive container 16 of battery B1. Detector means 20 could be a conventional device which could detect a conductive area and thereby complete a circuit that would deliver a current to activate switch S1 or it could be a magnetic device that upon detecting a magnetic band would activate switch S1. In the operational mode, once the battery B1 is inserted into the charger device 1 and contacts the terminals 10 and 12, the circuit will be complete and permit charging current to flow through battery B1. If the detector means 20 detects the annular exposed area 15, switch S1 will be activated to the closed position (shown by broken lines) thereby effectively removing resistor R2 from the circuit. With resistor R2 removed from the circuit, the charging current will increase and provide a quick charge to battery B1. On the other hand, if the annular exposed area 15 is not provided in battery B1, then switch S1 will remain in the open position (shown by solid line) and resistors R1 and R2 would remain in series in the circuit and provide a trickle charge to the battery.

Figure 2:
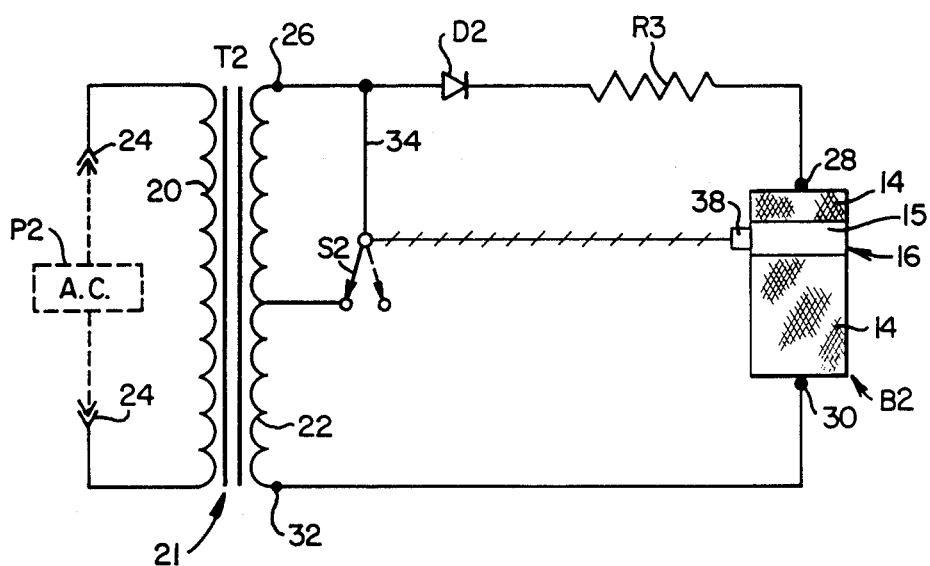
FIG. 2 is another circuit diagram showing a rechargeable battery of this invention being charged.

FIG. 2 shows another embodiment of the invention in which a transformer T2 comprises primary winding 20 and secondary winding 22. The primary terminals 24—24 are adapted to connect to an alternating power supply P2. One secondary terminal 26 is connected to diode D2 which in turn is connected in series with resistor R3. The opposite end of resistor R3 is connected to one output terminal 28 while the other output terminal 30 is connected to the other secondary terminal 32 of transformer T2. Output terminals 28–30 are adapted to receive a rechargeable battery B2. With a battery B2 inserted in output terminals 28–30 of the charger device 21 and with an alternating current connected to primary terminals 24—24, a charge current flows into the rechargeable battery B2. One end of a first electrical contact 34 is connected to terminal 26 of the secondary winding 22 with its opposite end connected to one end of switch S2. The opposite end of switch S2 is connected to the midpoint of the secondary winding 22. Switch S2 is normally in the closed position (shown by solid line) so that current induced in the secondary winding 22 will comprise only half the winding. Connected to switch S2 is detector means 38 which operates switch S2 when it detects the annular exposed area 15 of conductive container 16 of battery B1. With the switch S2 in the normal closed position (shown by solid line), one half of the winding in the secondary winding 22 will be shorted producing only a trickle charge to battery B2. Battery B2 is identical to battery B1 of FIG. 1 and has its insulating jacket 14 cut to provide an annular exposed area 15 of the conductive container 16 of battery B2. In the operational mode, a battery B2 is inserted into the charger device 21 to contact terminals 28–30 thereby completing the circuit of the charger. Resistor R3 is selected so that the charger provides a selected current charge (trickle charge) to battery B2. If detector 38 detects the annular exposed area 15 of battery B2, switch S2 will be activated to the open position (shown by broken lines) thereby effectively including the remaining one-half of the secondary windings into the circuit so that the full secondary winding is in the circuit. This will result in changing the charging current of the circuit to a fast charge rate. Thus a different charging current is provided to battery B2 if an indicator band such as the annular exposed area 15 is sensed by detector 38.

While the invention has been described in conjunction with the specific embodiment shown in the drawings, it is obvious that certain modifications may be made to the invention, without deviating from the scope of the invention. For example, a magnetic operating switch could be used to shunt resistor R1 in FIG. 1 when in the closed position and the switch could respond to the detection of a magnetic material. Thus when the indicator band on the rechargeable battery is a magnetic band and when the rechargeable battery is placed in the charger device, the magnetic band could activate the magnetic switch to the closed position thereby shunting resistor R2 from the circuit. Another example would be to use a photocell switch that would be responsive to the reflection of its emitting light. Thus the indicator band on the rechargeable battery could be a reflective band so that when the rechargeable battery is inserted into the charger device, the light from the photocell would be reflected thereby operating a conventional switch that would shunt a resistor or a portion of the windings in the secondary winding of the transformer in the circuit. As state above, one primary requirement of the rechargeable battery is that it is provided with an indicator band at a desired location that is capable of being detected by the charger device.

What is claimed:

1. A battery charger system for providing least two different rates of charging currents to rechargeable batteries and for distinguishing which rechargeable battery of similar size batteries should get which rate of charge current, said battery charger system comprising a rechargeable battery having a positive terminal and a spaced-apart negative terminal for delivering power and having an indicator band disposed between said positive terminal and said negative terminal to indicate a preferred charge rate of current the rechargeable battery can accommodate; a charging device comprising current means for delivering at least two different rates of charging current; and detection means for sensing the presence and location of the indicator band on the rechargeable battery and for directing the current means to provide a specific rate of charging current to the rechargeable battery depending on the presence and location of the indicator band on the rechargeable battery.

2. The battery charger system of claim 1 wherein the indicator band on the rechargeable battery is a conductive band.

3. The battery charger system of claim 1 wherein the indicator band on the rechargeable battery is a magnetic band.

4. The battery charger system of claim 1 wherein the indicator band on the rechargeable battery is a reflective band.

5. The battery charger system of claim 1 wherein the current means comprises a transformer with primary terminals coupled to an alternating power source, secondary terminals coupled to rectifier means and resistive means so as to provide a circuit for supplying current to charge the rechargeable battery; and wherein the detection means shunts a portion of the resistive means from the circuit of the current means when the detection means senses the indicator band on the rechargeable battery.

6. The battery charger of claim 5 wherein the indicator band on the rechargeable battery is a conductive band.

7. The battery charger of claim 5 wherein the indicator band on the rechargeable battery is a magnetic band.

8. The battery charger system of claim 1 wherein the current means comprises a transformer with a primary winding coupled to an alternating power source, a secondary winding coupled to rectifier means and resistive means so as to provide a circuit for supplying current to charge the rechargeable battery; and wherein the detection means includes the entire secondary winding when the detection means senses the indicator band on the rechargeable battery.

9. The battery charger of claim 8 wherein the indicator band on the rechargeable battery is a conductive band.

10. The battery charger of claim 8 wherein the indicator band on the rechargeable battery is a magnetic band.

11. A rechargeable battery for use in a charger device capable of delivering at least two different rates of charge current, said rechargeable battery having a positive terminal and a spaced-apart negative terminal for delivering external power and receiving charging power, an indicator band disposed between said positive terminal and said negative terminal in which the location of said indicator band is indicative of the rate of charge that the rechargeable battery can safely accommodate other than the rate of charge it could accept in the absence of the indicator band.

12. The rechargeable battery of claim 11 wherein the indicator band is a conductive band.

13. The rechargeable battery of claim 11 wherein the indicator band is a magnetic band.

14. The rechargeable battery of claim 11 wherein the indicator band is a reflective band.

15. The rechargeable battery of claim 11 wherein said rechargeable battery comprises a conductive container wrapped with an insulative material, said insulative material separated to expose a portion of the conductive container and said exposed portion of the conductive container functions as the indicator band.

16. The rechargeable battery of claim 15 wherein said rechargeable battery is a cylindrical rechargeable battery having a longitudinal axis and wherein said insulative material is separated at a location different from the midpoint of the longitudinal axis to expose an annular area of the conductive container.

* * * * *